US012380037B2

(12) United States Patent
He et al.

(10) Patent No.: US 12,380,037 B2
(45) Date of Patent: Aug. 5, 2025

(54) INFORMATION HANDLING SYSTEM WITH A SWITCH CIRCUIT TO PERFORM AS A DOCK

(71) Applicant: DELL PRODUCTS L.P., Round Rock, TX (US)

(72) Inventors: Qinghong He, Austin, TX (US); Arnold Thomas Schnell, Hutto, TX (US)

(73) Assignee: Dell Products L.P., Round Rock, TX (US)

( * ) Notice: Subject to any disclaimer, the term of this patent is extended or adjusted under 35 U.S.C. 154(b) by 117 days.

(21) Appl. No.: 18/364,501

(22) Filed: Aug. 3, 2023

(65) Prior Publication Data

US 2025/0045209 A1    Feb. 6, 2025

(51) Int. Cl.
*G06F 13/10* (2006.01)
*G06F 1/16* (2006.01)

(52) U.S. Cl.
CPC ............ *G06F 13/10* (2013.01); *G06F 1/1632* (2013.01); *G06F 2213/40* (2013.01)

(58) Field of Classification Search
CPC ..... G06F 13/10; G06F 1/1632; G06F 2213/40
See application file for complete search history.

(56) References Cited

U.S. PATENT DOCUMENTS

| | | | | |
|---|---|---|---|---|
| 2011/0080342 | A1* | 4/2011 | Haren | G06F 3/1431 345/1.3 |
| 2014/0297897 | A1* | 10/2014 | Halim | G06F 13/409 710/14 |
| 2020/0259805 | A1 | 8/2020 | Grobelny et al. | |
| 2023/0039167 | A1 | 2/2023 | Kamepalli et al. | |
| 2023/0236632 | A1* | 7/2023 | Lukanc | G06F 8/65 361/679.41 |

FOREIGN PATENT DOCUMENTS

GB    2486412    *  6/2012

OTHER PUBLICATIONS

Apple TV User Guide, copyright 2011, [online] retreived on Jan. 22, 2025 from <URL: https://cdsassets.apple.com/live/6GJYWVAV/start/ma1607_apple_tv_3rd_gen_setup.pdf> (Year: 2011).*

* cited by examiner

*Primary Examiner* — Eric T Oberly
(74) *Attorney, Agent, or Firm* — Larson Newman, LLP

(57) ABSTRACT

An information handling system includes dock and compute portions. The dock portion communicates with a peripheral device. The compute portion includes an external communication port and a processor. The processor determines whether an external information handling system is connected to the external communication port. In response to the external information handling system being connected to the external communication port, the processor enters the information handling system into a dock operating mode. While in the dock operating mode commands from the external information handling system are provided from the external communication port, through the dock portion, and to the peripheral device. In response to the external information handling system not being connected to the external communication port, the processor enters the information handling system into a compute operating mode. While in the compute operating mode, commands from the processor are provided through the dock portion to the peripheral device.

20 Claims, 6 Drawing Sheets

INFORMATION HANDLING SYSTEM WITH A SWITCH CIRCUIT TO PERFORM AS A DOCK

FIELD OF THE DISCLOSURE

The present disclosure generally relates to information handling systems, and more particularly relates to an information handling system with a switch circuit to perform as a dock.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a dock portion and a compute portion. The dock portion communicate with a peripheral device. The compute portion includes an external communication port and a processor. The processor may determine whether an external information handling system is connected to the external communication port. In response to the external information handling system being connected to the external communication port, the processor may enter the information handling system into a dock operating mode. While in the dock operating mode commands from the external information handling system may be provided from the external communication port, through the dock portion, and to the peripheral device. In response to the external information handling system not being connected to the external communication port, the processor may enter the information handling system into a compute operating mode. While in the compute operating mode, commands from the processor may be provided through the dock portion to the peripheral device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
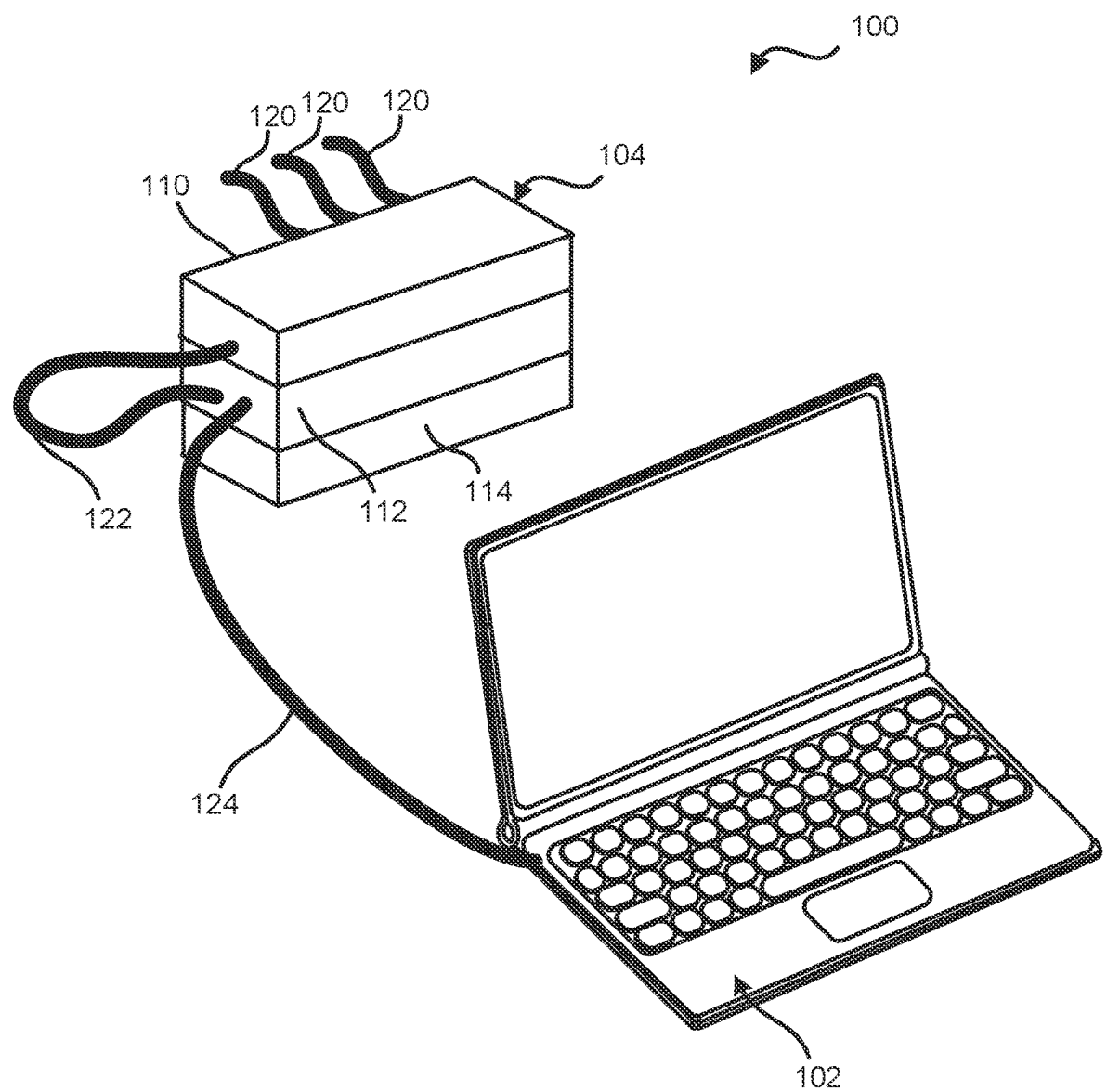
FIG. 1 is a diagram of a system including multiple information handling systems according to at least one embodiment of the present disclosure.

FIG. 1 illustrates a system 100 including information handling systems 102 and 104 according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 104 includes a dock portion 110, a compute portion 112, and a graphics portion 114. Dock portion 110 may communicate with a display device or other peripheral device via cables 120. In an example, dock portion 110 may include additional ports to communication with additional display devices. Compute portion 112 may communicate with dock portion 110 via cable 122 and with portable information handling system 102 via cable 124. Information handling system 104 may include additional components without varying from the scope of this disclosure.

In previous systems, if a mobile device is not present in the system, a docking station may be idle such that resources in the docking station are not utilized. In these previous systems, an individual may not be able to perform any operations, such as printing a document, with the docking station unless another information handling system is connected. Additionally, in previous information handling system a docking station may not be connected to a network with another information handling system is not in communication with the docking station. In this situation, firmware updates may not be pushed to the docking station without the connected mobile information handling system. Information handling system 104 may be improved by enabling the information handling system to switch between a compute operation mode and a docking operation mode.

In an example, compute portion 112 includes only two external ports. One external port may be connected to dock portion 110 via cable 122 and the other external port may be connected to information handling system 102 via cable 124. The dock portion 110 also may be internally coupled to the compute portion 112. In certain examples, compute portion 112 does not include more than two external ports. In an example, compute portion 112 may be internally coupled to graphics portion 114. In another example, information handling system 104 may not include graphic portion 114.

Upon startup or boot of information handling system 104, compute portion 112 may be initialized in a compute operation mode. While in the compute operation mode, compute portion 112 may communicate with one or more peripheral devices, such as a keyboard, a pointing device, or the like. In an example, compute portion 112 may perform one or more operations including, but not limited to, word processing, printing documents, and connecting to websites. In this example, compute portion 112 may provide different signals to dock portion 122 via cable 122 based on the operations performed by a processor, such as processor 220 of FIG. 2, in the compute portion.

In an example, information handling system 102 may be connected to compute portion 112 via cable 124. Based on the connection of information handling system 102 to compute portion 112, information handling system 102 may provide one or more commands to the compute portion. In response to the commands from information handling system 102, compute portion 112 may suspend operations perform in a processor within the compute portion and enter a docking operation mode. While in the docking operation mode, compute portion 112 may provide the commands from information handling system 102 to a peripheral device via cables 120. In an example, when compute portion 112 is in the docking operation mode, a keyboard or pointing device in communication with the compute portion may communicate with information handling system 102 such that these devices may be utilized as peripheral devices for information handling system 102.

When information handling system 102 is unplugged from compute portion 112, the compute portion may enter the compute operation mode and resume any suspended operations in the processor of the compute portion. In an example, graphics portion 114 may provide extra computing capabilities for compute portion 112 when the compute portion is in the compute operation mode. Graphic portion 114 may also provide extra computing capabilities for information handling system 102 when compute portion 112 is in the dock operation mode. Different embodiments of compute portion 112 switching between the compute and dock operation modes will be described with respect to FIGS. 2-4 below. In an example, while dock portion 110 and compute portion 112 are illustrated as two separate devices, these portions of information handling system 104 may be incorporated as a single device with an external port to communicate with information handling system 102 and ports to communicate with peripheral devices. In this example, information handling system 102 may be a stand alone system with a dock input port, but without external ports to connect dock portion 110 with compute portion 112.

Figure 2:
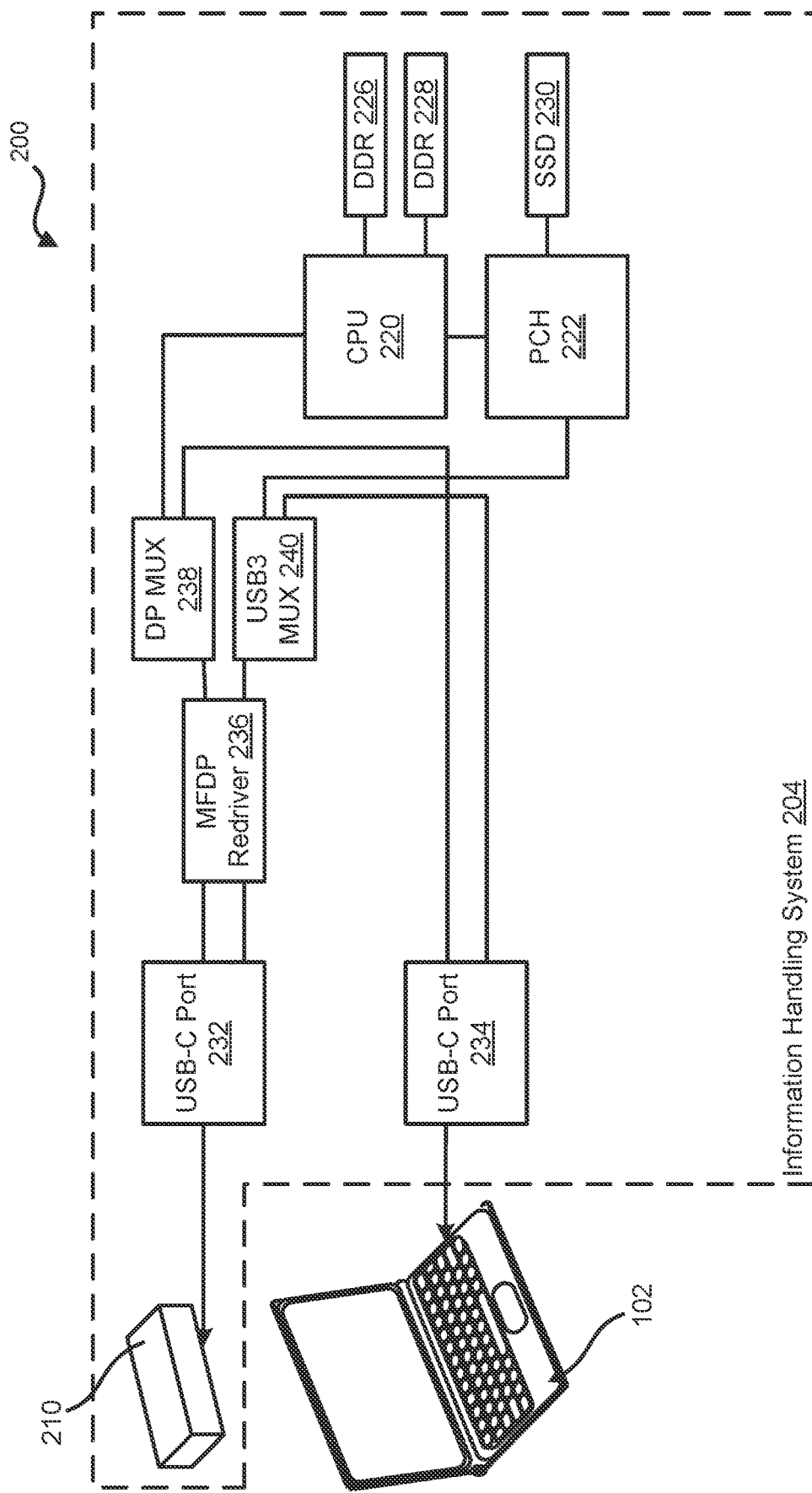
FIG. 2 is a block diagram of an embodiment of an information handling system according to at least one embodiment of the present disclosure.

FIG. 2 illustrates a system 200 including an information handling system 204 and information handling system 102 according to at least one embodiment of the present disclosure. Information handling system 204 may be substantially similar to information handling system 104 of FIG. 1. Information handling system 204 includes a dock portion 210, a processor 220, a platform controller hub (PCH) 222, memory components 226 and 228, and a storage device 230. In an example, memory components 226 and 228 may be any suitable random access memory (RAM), such as DDR4, DDR5, or the like. Storage device 230 may be any suitable storage, such as a solid state drive, a disk drive, or the like. Information handling system 204 further includes ports 232 and 234, a re-driver 236, and multiplexers 238 and 240. In an example, ports 232 and 234 may be any suitable type of input/output port, such as universal serial bus type C (USB-C) ports. Multiplexer 238 may be any suitable type of multiplexer, such as a display port multiplexer. Multiplexer 240 may be any suitable type of multiplexer, such as a USB3 multiplexer. In certain examples, port 232 may primarily be an output port to provide commands to dock portion 210. Port 234 may primarily be an input port to receive commands from information handling system 102. Information handling system 204 may include additional components without varying from the scope of this disclosure.

When information handling system 204 is initialized or booted, the information handling system may be in a compute operation mode. In an example, processor 220, PCH 222, memories 226 and 228, and storage device 230 may combine to form a compute complex of information handling system 204. For example, processor 220, PCH 222, memories 226 and 228, and storage device 230 may perform operations that substantially similar to those performed in any information handling system, such as word processing, communicating with websites, electronic mail operations, data computation, or the like. In certain examples, CPU 220 may process and perform operations for multiple computation threads. CPU 220 may provide any output commands to dock portion 210, which in turn may provide the output commands to peripheral device in communication with the dock portion.

In certain examples, CPU 220 may provide the commands to port 232 via multiplexer 238 and re-driver 236. In an example, the communication channel between CPU 220 and multiplexer 238 may be a four lane display port communication channel, and the communication channel between multiplexer 238 and re-driver 236 may also be a four lane display port communication channel. In certain examples, re-driver 236 may amplify and drive the display port signaling through the USB-C port. Output port 232 may provide the USB signaling to dock portion 210, which in turn may provide the command to a peripheral device in communication with the dock portion.

When information handling system 102 is connected to port 234, a detection command may be received at processor 220. In response to the detection command, information handling system 204 may enter the dock operation mode and processor 220 may suspend any operations that are currently being executed. In another example, while information handling system 204 is in the dock operation mode, processor 220 may no longer have access to port 232 without suspending operations. During the dock operation mode, multiplexers 238 and 240 may provide commands from port 234 to port 232 via re-driver 236. While information handling system 204 is in the dock operation mode, components of information handling system 204 may operate as a pass through components for commands from information handling system 102 to dock portion 210. For example, multiplexers 238 and 240 may output commands from information handling system 102 instead of commands from processor 220.

In certain examples, when information handling system 102 is unplugged from port 234, a disconnect command may be received at processor 220. In response to the disconnect command, information handling system 204 may enter compute operation mode and processor 220 may re-initiate any operations that were previously suspended.

Figure 3:
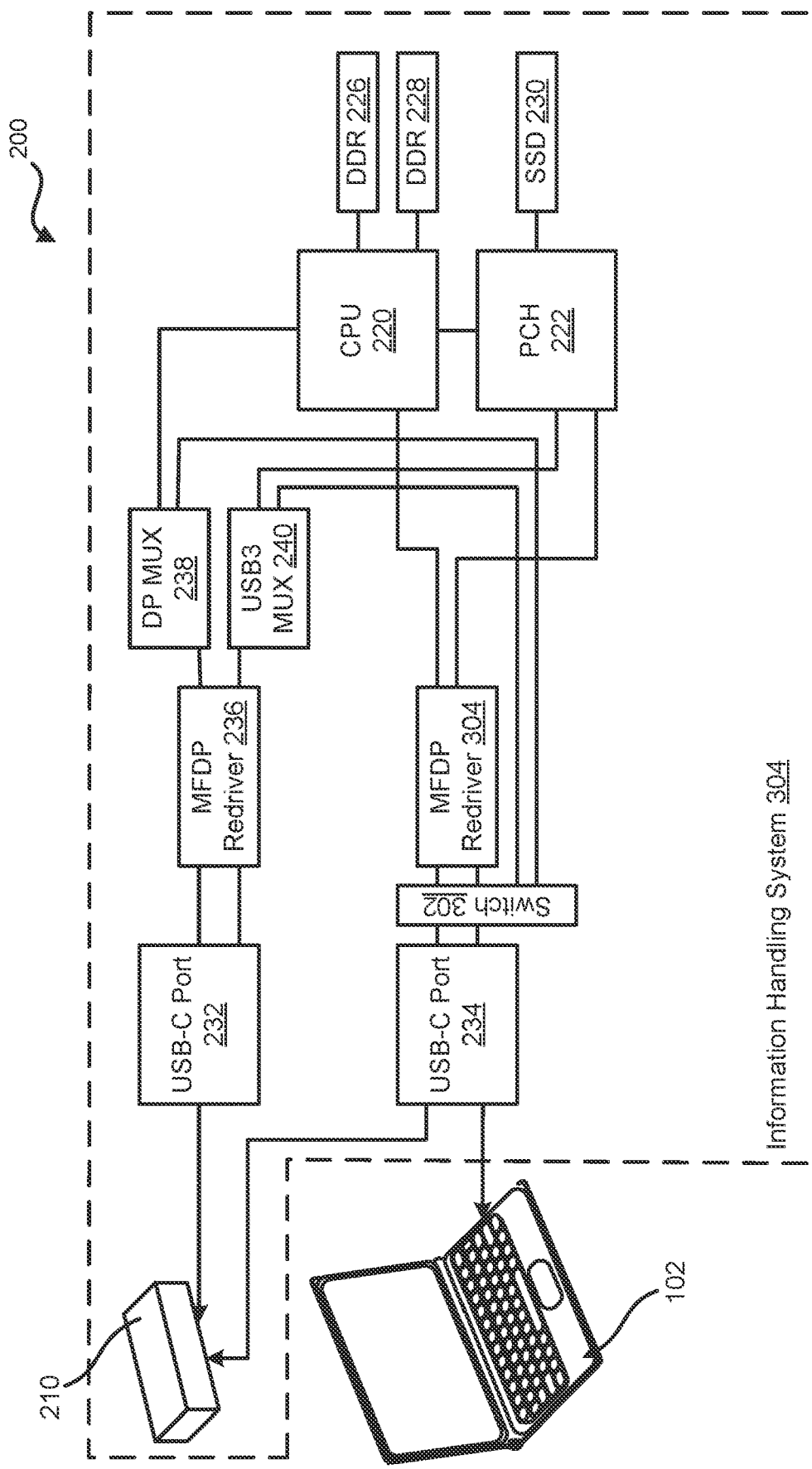
FIG. 3 is a block diagram of another embodiment of an information handling system according to at least one embodiment of the present disclosure.

FIG. 3 illustrates system 200 including an information handling system 304 and information handling system 102 according to at least one embodiment of the present disclosure. Information handling system 304 may be substantially similar to information handling system 204 of FIG. 1. Information handling system 304 includes a switch 302, a re-driver 304, dock portion 210, processor 220, PCH 222, memory components 226 and 228, and storage device 230. Information handling system 304 further includes ports 232 and 234, re-driver 236, and multiplexers 238 and 240. Information handling system 304 may include additional components without varying from the scope of this disclosure.

When information handling system 304 is initialized or booted, the information handling system may be in a compute operation mode. While information handling system 304 is in the compute operation mode, processor 220, PCH 222, memories 226 and 228, storage device 230, port 232, re-driver 236, and multiplexers 238 and 240 may perform any suitable operations including, but not limited to, the operations described above with respect to FIG. 2. When information handling system 304 is in the compute operation mode, processor 220 may utilize port 234 as another output port. In this situation, processor 220 may provide one or more commands through re-driver 304, switch 302, and port 234 to dock portion 210 for output to one or more peripheral devices in communication with information handling system 304.

When information handling system 102 is connected to port 234, a detection command may be received at processor 220. In response to the detection command, information handling system 204 may enter the dock operation mode and processor 220 and information handling system 104 may perform operations that are substantially similar to those described above with respect to FIG. 2.

In an example, while information handling system 304 is in the dock operation mode, information handling system 102 may have access to and utilize memories 226 and 228 and storage 230. For example, information handling system 102 may access memories 226 and 228 by forming a cooperative multi-processor configuration with processor 220. Similarly, information handling system 102 may access storage 230 via a cooperative multi-processor configuration with processor 220. In certain examples, information handling system 102 may utilize these communication paths to improve processing speeds and storage space while the information handling system 102 is docked to information handling system 304.

In certain examples, when information handling system 102 is unplugged from port 234, a disconnect command may be received at processor 220. In response to the disconnect command, information handling system 304 may enter compute operation mode and processor 220 and EC 224 may re-initiate any operations that were previously suspended.

Figure 4:
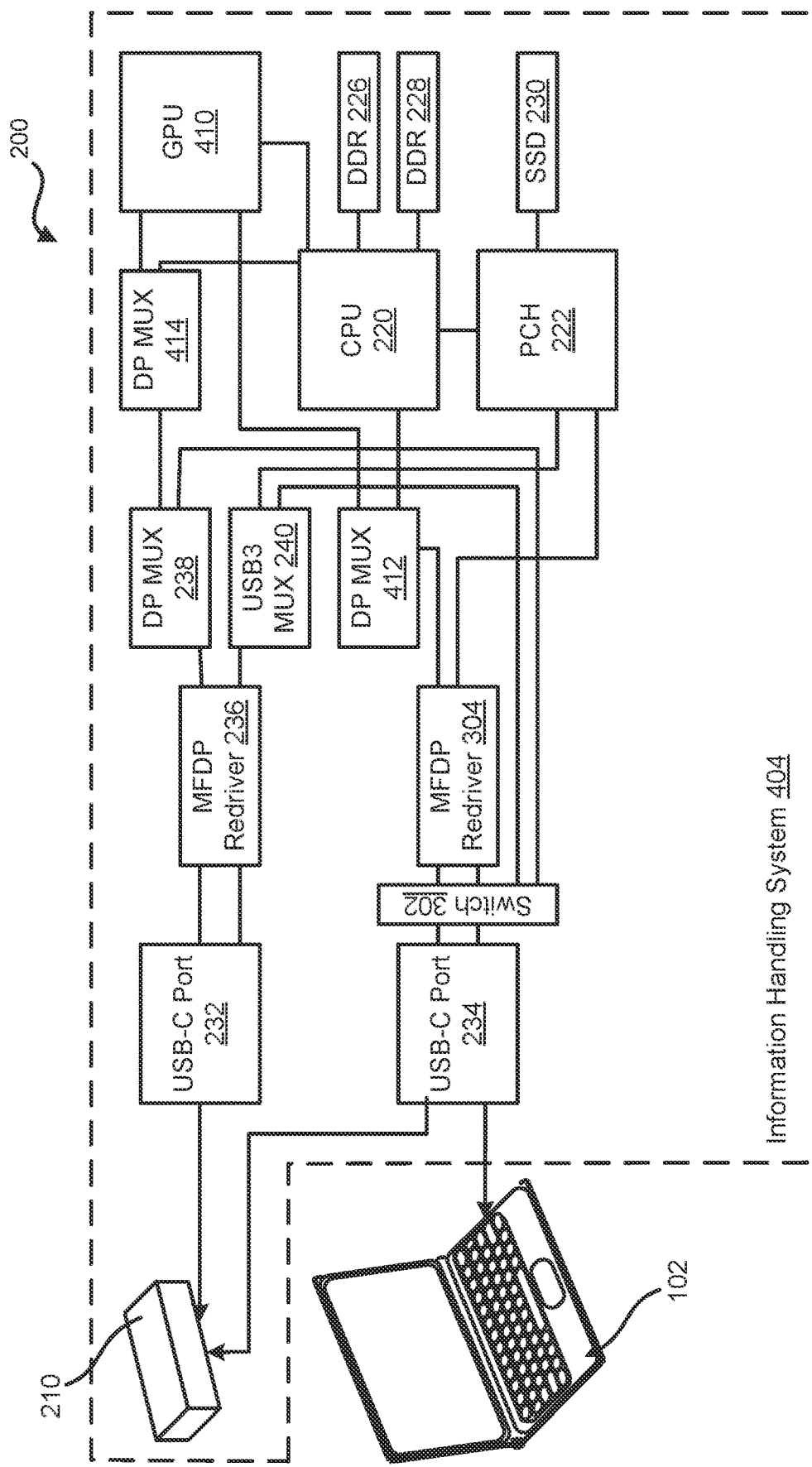
FIG. 4 is a block diagram of another embodiment of an information handling system according to at least one embodiment of the present disclosure.

FIG. 4 illustrates system 200 including an information handling system 404 and information handling system 102 according to at least one embodiment of the present disclosure. Information handling system 404 may be substantially similar to information handling system 204 of FIG. 1. Information handling system 404 includes a graphics processing unit (GPU) 410, multiplexers 412 and 414, switch 302, re-driver 304, dock portion 210, processor 220, PCH 222, memory components 226 and 228, and storage device 230. Information handling system 304 further includes ports 232 and 234, re-driver 236, and multiplexers 238 and 240. In an example, multiplexers 412 and 414 may be any suitable type of multiplexer, such as display port multiplexers. Information handling system 404 may include additional components without varying from the scope of this disclosure.

When information handling system 404 is initialized or booted, the information handling system may be in a compute operation mode. While information handling system 404 is in the compute operation mode, processor 220, PCH 222, memories 226 and 228, storage device 230, port 232, re-driver 236, and multiplexers 238 and 240 may perform any suitable operations including, but not limited to, the operations described above with respect to FIG. 2.

During the compute operation mode, processor 220 may access GPU 410. In an example, GPU 410 may be a discrete GPU that may be utilized by information handling system 102 in a gaming mode. In this example, commands may be provided from processor 220 to GPU 410. After GPU 410 has perform one or more operations based on the received commands and data, the GPU may provide output data for images to a display device via multiplexer 414, multiplexer 238, re-driver 236, port 232, and dock portion 210.

When information handling system 102 is connected to port 234, a detection command may be received at processor 220. In response to the detection command, information handling system 404 may enter the dock operation mode and processor 220 and information handling system 404 may perform operations that are substantially similar to those described above with respect to FIG. 2. While information handling system 404 is in dock operation mode, information handling system 102 may also perform the operations described above with respect to FIG. 3.

In certain examples, when information handling system 102 is unplugged from port 234, a disconnect command may be received at processor 220. In response to the disconnect command, information handling system 204 may enter compute operation mode and processor 220 and EC 224 may re-initiate any operations that were previously suspended.

Figure 5:
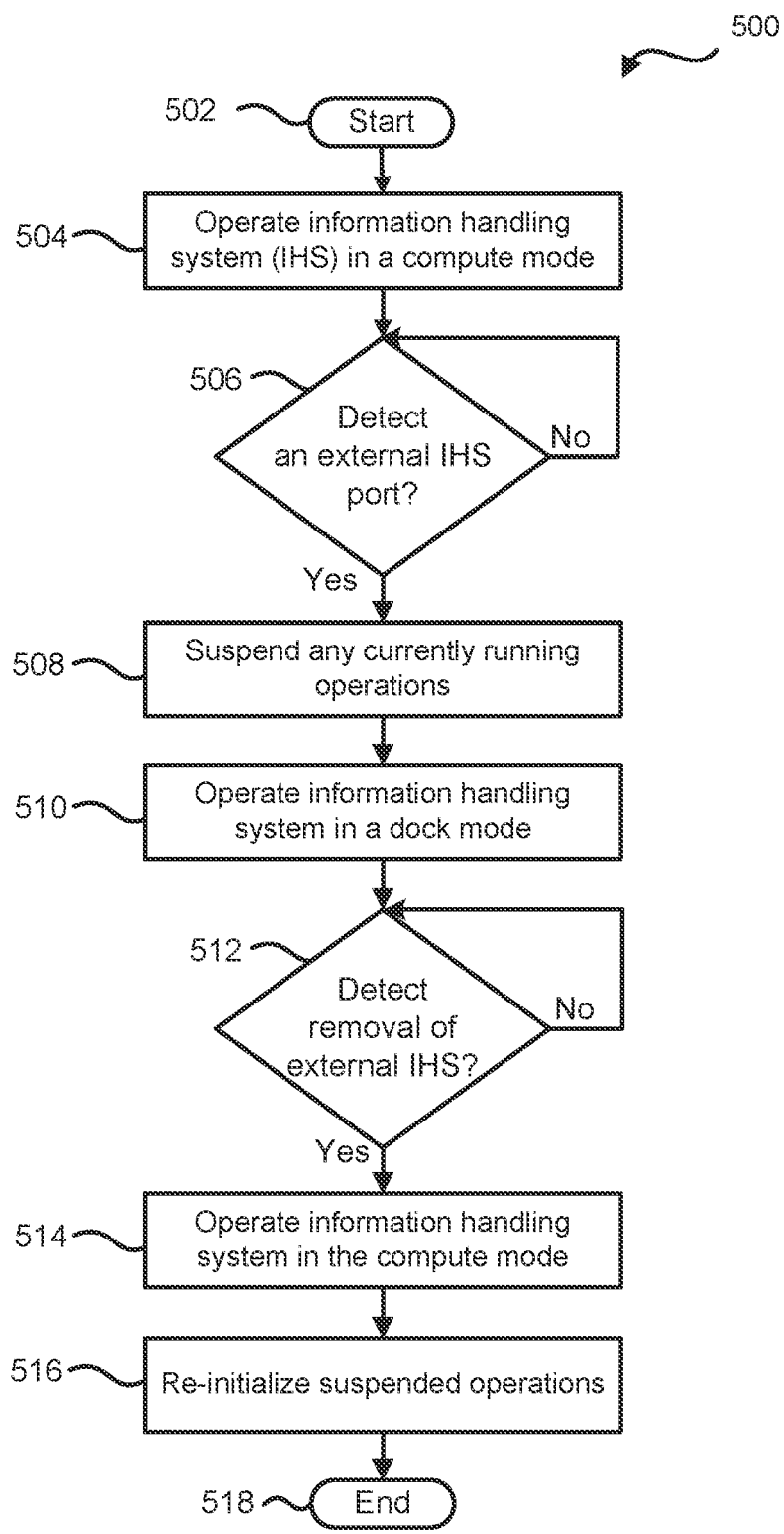
FIG. 5 is a flow diagram of a method for performing dock operation in an information handling system according to at least one embodiment of the present disclosure.

FIG. 5 shows a method 500 for performing dock operation in an information handling system according to at least one embodiment of the present disclosure, starting at block 502. In an example, method 500 may be performed by any suitable component including, but not limited to, processor 220 and EC 224 of FIGS. 2-4. Not every method step set forth in this flow diagram is always necessary, and that certain steps of the methods may be combined, performed simultaneously, in a different order, or perhaps omitted, without varying from the scope of the disclosure.

At block 504, an information handling system is operated in a compute operating mode. In an example, the information handling system may enter the compute operating mode upon initialization or completion of a system boot. While the information handling system is in the compute operating mode, the information handling system may perform any suitable operation, such as word processing, communicating with websites, electronic mail operations, data computation, or the like.

At block 506, a determination is made whether another information handling system is connected to an external port. In an example, external port may be coupled to a compute portion of the information handling system. In response to another information handling system being detected, any currently running operations or commands are suspended at block 508. In an example, these operations or commands may be executed in a processor of a compute portion of the information handling system.

At block 510, the information handling system is operated in a dock operation mode. In certain examples, the dock operation mode may cause the component of the information handling system to perform pass through operations for the other information handling system connected to the external IO port. For example, the external information handling system may provide a command and data for a print job to be performed on a printer connected to a dock portion of the information handling system. In an example, while the information handling system is in the dock operating mode, the external information handling system may access memory devices, storage devices, or processing device of the information handling system. The processing device may be a discrete GPU to increase image processing of the external information handling system.

At block 512, a determination is made whether the external device has been unplugged from the external port of the information handling system. In response to the external information handling system being unplugged, the information handling system may begin to operate in the compute operating mode at block 514. At block 516, suspended operations may be re-initialized and the flow ends at block 518. In an example, the re-initialized operations may include, but are not limited to, utilizing the discrete GPU for image processing.

Figure 6:
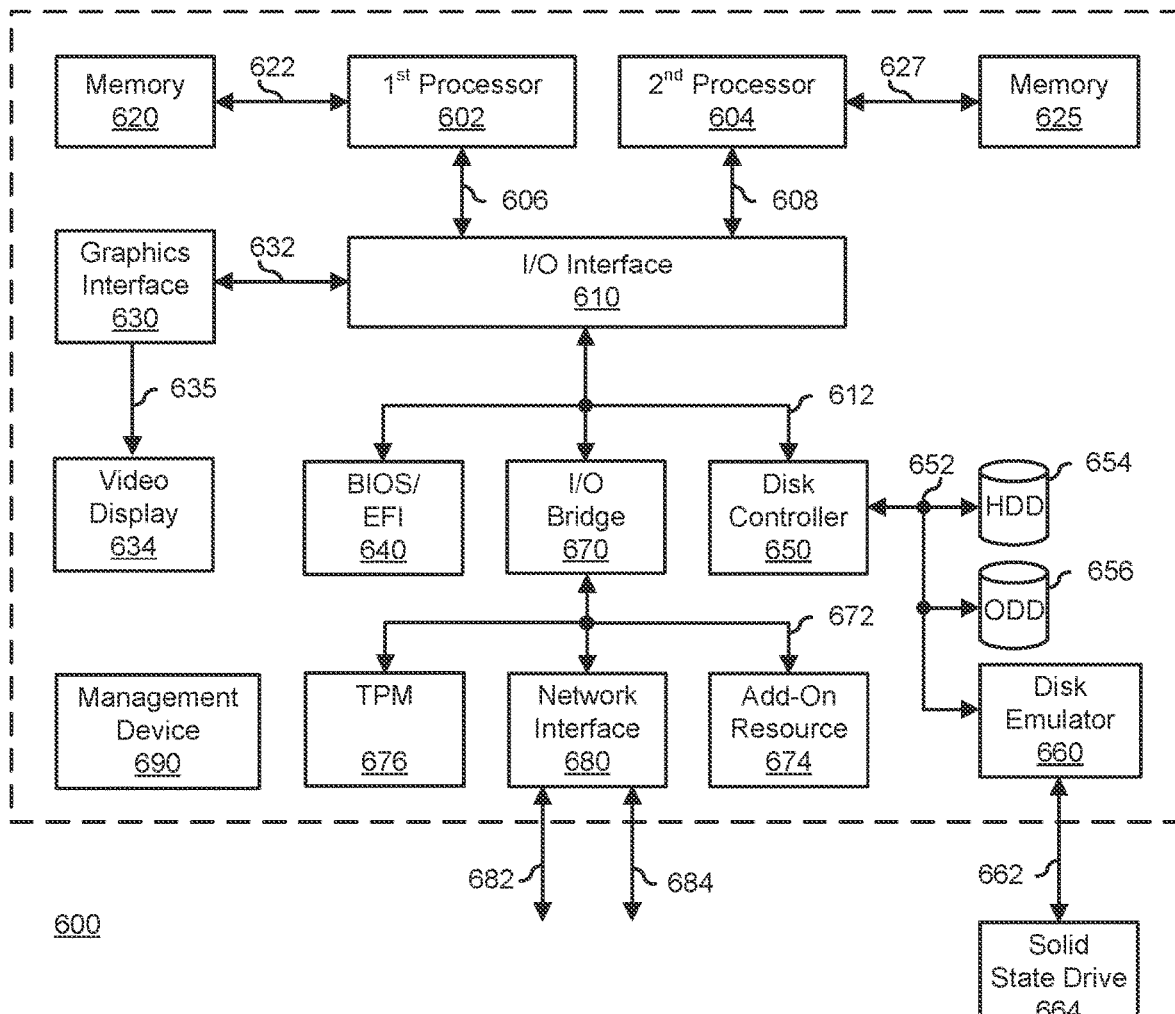
FIG. 6 is a block diagram of a general information handling system according to an embodiment of the present disclosure.

FIG. 6 shows a generalized embodiment of an information handling system 600 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described below and operates to perform one or more of the methods described below. Information handling system 600 includes a processors 602 and 604, an input/output (I/O) interface 610, memories 620 and 625, a graphics interface 630, a basic input and output system/universal extensible firmware interface (BIOS/UEFI) module 640, a disk controller 650, a hard disk drive (HDD) 654, an optical disk drive (ODD) 656, a disk emulator 660 connected to an external solid state drive (SSD) 662, an I/O bridge 670, one or more add-on resources 674, a trusted platform module (TPM) 676, a network interface 680, a management device 690, and a power supply 695. Processors 602 and 604, I/O interface 610, memory 620, graphics interface 630, BIOS/UEFI module 640, disk controller 650, HDD 654, ODD 656, disk emulator 660, SSD 662, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632 and provides a video display output 636 to a video display 634. In a particular embodiment, information handling system 600 includes separate memories that are dedicated to each of processors 602 and 604 via separate memory interfaces. An example of memories 620 and 630 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

Disk controller 650 includes a disk interface 652 that connects the disk controller to HDD 654, to ODD 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 600 via an external interface 662. An example of external interface 662 includes a USB interface, an IEEE 4394 (Firewire) interface, a proprietary interface, or a combination thereof. Alternatively, solid-state drive 664 can be disposed within information handling system 600.

I/O bridge 670 includes a peripheral interface 672 that connects the I/O bridge to add-on resource 674, to TPM 676, and to network interface 680. Peripheral interface 672 can be the same type of interface as I/O channel 612 or can be a different type of interface. As such, I/O bridge 670 extends the capacity of I/O channel 612 when peripheral interface 672 and the I/O channel are of the same type, and the I/O bridge translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated embedded controller (EC) System-on-a-Chip (SoC) device, one or more associated memory devices, one or more network interface devices, a complex programmable logic device (CPLD), and the like, which operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 600, such as system cooling fans and power supplies. Management device 690 can include a network connection to an external management system, and the management device can communicate with the management system to report status information for information handling system 600, to receive BIOS/UEFI or system firmware updates, or to perform other task for managing and controlling the operation of information handling system 600.

Management device 690 can operate off of a separate power plane from the components of the host environment so that the management device receives power to manage information handling system 600 when the information handling system is otherwise shut down. An example of management device 690 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 690 may further include associated memory devices, logic devices, security devices, or the like, as needed, or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a dock portion configured to communicate with a peripheral device; and
   a compute portion including:
   an external communication port;
   a processor to communicate with the dock portion, the processor to:
   determine whether an external information handling system is connected to the external communication port;
   in response to the external information handling system being connected to the external communication port, enter the information handling system into a dock operating mode, wherein while in the dock operating mode, commands from the external information handling system are provided from the external communication port, through the dock portion, and to the peripheral device; and
   in response to the external information handling system not being connected to the external communication port, enter the information handling system into a compute operating mode, wherein while in the compute operating mode, commands from the processor are provided through the dock portion to the peripheral device; and
a switch to route a command and data from the external communication port to one of a plurality of components within the information handling system or to the peripheral device.

2. The information handling system of claim 1, further comprising:
a second external communication port to connect the compute portion with the dock portion.

3. The information handling system of claim 1, further comprising a graphics processing unit to communicate with the external information handling system when the information handling system is in the dock operating mode, and to communicate with the processor when the information handling system is in the compute operating mode.

4. The information handling system of claim 1, wherein prior to the information handling system being entered into the dock operating mode, the processor further to: suspend an operation being performed in the processor.

5. The information handling system of claim 1, wherein in response to the information handling system being entered into the compute operating mode, the processor further to: re-initialize any suspended operations.

6. The information handling system of claim 1, further comprising:
a memory device, wherein the external information handling system may access the memory device when the information handling system is in the dock operating mode.

7. The information handling system of claim 1, further comprising a storage device, wherein the external information handling system may access the storage device when the information handling system is in the dock operating mode.

8. The information handling system of claim 1, wherein while in the dock operating mode, the plurality of components operate as pass through components.

9. A method comprising:
determining, by a processor of a first information handling system, whether a second information handling system is connected to an external communication port of the first information handling system;
in response to the second information handling system being connected to the external communication port, entering, by the processor, the information handling system into a dock operating mode,
while in the dock operating mode, providing commands from the second information handling system through the external communication port, the dock portion, and to a peripheral device; and
in response to the second information handling system not being connected to the external communication port, entering the information handling system into a compute operating mode;
communicating, by a graphics processing unit of the information handling system, with the external information handling system when the information handling system is in the dock operating mode; and
while in the compute operating mode:
providing commands from the processor through the dock portion to the peripheral device; and
communicating, by the graphics processing unit, with the processor.

10. The method of claim 9, further comprising providing, by the processor, a command to the peripheral device via a second external communication port.

11. The method of claim 9, further comprising:
routing, by a switch of the information handling system, a command and data from the external communication port to one of a plurality of components within the information handling system or to the peripheral device.

12. The method of claim 9, wherein prior to the information handling system being entered into the dock operating mode, the method further comprises: suspending an operation being performed in the processor.

13. The method of claim 9, wherein in response to the information handling system being entered into the compute operating mode, the method further comprises: re-initializing any suspended operations.

14. The method of claim 9, further comprising:
providing the second information handing system with access to a memory device of the information handling system when the information handling system is in the dock operating mode.

15. The method of claim 9, further comprising:
providing the second information handing system with access to a storage device of the information handling system when the information handling system is in the dock operating mode.

16. An information handling system comprising:
a dock portion configured to communicate with a peripheral device; and
a compute portion including:
first and second external communication ports, wherein the compute portion may communicate with the dock portion via the second external communication port;
a switch to route a command and data from the second external communication port to one of a plurality of components within the information handling system or to the peripheral device; and
a processor to:
if an external information handling system is connected to the first external communication port, then enter the information handling system into a dock operating mode, wherein while in the dock operating mode commands from the external information handling system are provided from the first external communication port, through the second external communication port, through the dock portion, and to the peripheral device; and
if the external information handling system is not connected to the first external communication port, then enter the information handling system into a compute operating mode, wherein while in the compute operating mode commands from the processor are provided through the second external communication port, to dock portion and to the peripheral device.

17. The information handling system of claim 16, further comprising:
a graphics processing unit to communicate with the external information handling system when the information handling system is in the dock operating mode, and to communicate with the processor when the information handling system is in the compute operating mode.

18. The information handling system of claim 16, wherein prior to the information handling system being entered into the dock operating mode, the processor further to: suspend an operation being performed in the processor.

19. The information handling system of claim 16, wherein in response to the information handling system being entered into the compute operating mode, the processor further to: re-initialize any suspended operations.

20. The information handling system of claim 16, wherein while in the dock operating mode, the plurality of components operate as pass through components.

* * * * *